(12) United States Patent
Wu

(10) Patent No.: US 12,622,546 B2
(45) Date of Patent: May 12, 2026

(54) POWDER DISCHARGE OUTLET AND A BEAN GRINDER WITH THE POWDER DISCHARGE OUTLET

(71) Applicant: GUANGDONG TAINENG ELECTRIC APPLIANCE MANUFACTURING CO., LTD., Dongguan (CN)

(72) Inventor: Junyan Wu, Dongguan (CN)

(73) Assignee: GUANGDONG TAINENG ELECTRIC APPLIANCE MANUFACTURING CO., LTD., Dongguan (CN)

( * ) Notice: Subject to any disclaimer, the term of this patent is extended or adjusted under 35 U.S.C. 154(b) by 300 days.

(21) Appl. No.: 18/391,778

(22) Filed: Dec. 21, 2023

(65) Prior Publication Data

US 2024/0122406 A1 Apr. 18, 2024

Related U.S. Application Data

(63) Continuation of application No. PCT/CN2022/104886, filed on Jul. 11, 2022.

(30) Foreign Application Priority Data

Jun. 14, 2022 (CN) .......................... 202210666501.8

(51) Int. Cl.
*A47J 42/38* (2006.01)
*A47J 42/40* (2006.01)
(52) U.S. Cl.
CPC ............... *A47J 42/40* (2013.01); *A47J 42/38* (2013.01)

(58) Field of Classification Search
CPC .................................. A47J 42/38; A47J 42/40
See application file for complete search history.

(56) References Cited

U.S. PATENT DOCUMENTS

| | | | | | |
|---|---|---|---|---|---|
| 4,023,602 A | * | 5/1977 | Sparr, Sr. | ............... | B65D 83/06 |
| | | | | | 141/311 R |
| 4,856,681 A | * | 8/1989 | Murray | ................... | A47F 1/035 |
| | | | | | 222/243 |

(Continued)

FOREIGN PATENT DOCUMENTS

| | | |
|---|---|---|
| CN | 208808197 U | 3/2019 |
| CN | 209153206 U | 7/2019 |

(Continued)

*Primary Examiner* — Frederick C Nicolas
(74) *Attorney, Agent, or Firm* — Birchwood IP

(57) ABSTRACT

The present invention discloses a powder discharge outlet and a bean grinder with the powder outlet, in particular to the technical field of bean grinders; including a powder discharge pipe, on which an upper bracket and a lower bracket are arranged, respectively, an annular upper tooth seat is arranged on the outer wall of the powder discharge pipe, a plurality of upper vibrating teeth are evenly arranged along the circumference of the upper tooth seat, a powder nozzle is arranged at the bottom of the lower bracket, a knob is arranged at the top of the powder nozzle, an annular lower tooth seat is arranged at the upper part of the powder nozzle, and a plurality of lower vibrating teeth corresponding to the upper vibrating teeth are arranged at the top of the lower tooth seat; the present invention can effectively shake powder from the powder discharge pipe.

18 Claims, 7 Drawing Sheets

(56)            References Cited

U.S. PATENT DOCUMENTS

| | | | | |
|---|---|---|---|---|
| 2020/0315401 | A1* | 10/2020 | Deuber | .................. A47J 42/56 |
| 2023/0284833 | A1* | 9/2023 | Quaratesi | ............... A47J 42/50 |

FOREIGN PATENT DOCUMENTS

| | | | |
|---|---|---|---|
| CN | 209366956 | U | 9/2019 |
| CN | 210102981 | U | 2/2020 |
| CN | 211109022 | U | 7/2020 |
| CN | 211380961 | U | 9/2020 |
| CN | 101875859 | A | 11/2020 |
| WO | 2016074848 | A2 | 5/2016 |

* cited by examiner

7

POWDER DISCHARGE OUTLET AND A BEAN GRINDER WITH THE POWDER DISCHARGE OUTLET

CROSS-REFERENCE TO RELATED APPLICATIONS

The present application is a U. S. continuation of co-pending International Patent Application No. PCT/CN2022/104886 filed Jul. 11, 2022, which claims foreign priority of Chinese Patent Application No. 202210666501.8, filed on Jun. 14, 2022 in the State Intellectual Properly Office of China, the contents of all of which are hereby incorporated by reference.

TECHNICAL FIELD

The present invention relates to the technical field of bean grinders, in particular to a powder discharge outlet and a bean grinder equipped with the powder discharge outlet.

BACKGROUND

Existing bean grinders are generally equipped with a powder outlet integrated with or fixed on their housing. The powder outlet is located on the lower side of the cutter head. With the rotation of the cutter head, ground powder is discharged through the powder outlet. However, powder (especially ground coffee with high value) is accumulated on the inner wall of the pipe in the powder outlet due to electrostatic adsorption, which would cause waste. What's more, powder accumulated in the powder outlet for a long time would be deteriorated, breeding bacteria and affecting edible quality. In order to solve the problem of powder accumulation in the powder outlet, in traditional way, users generally flick or tap the powder outlet after grinding powder to vibrate the powder outlet and shake residual powder out of the powder outlet. However, as the powder outlet is integrated with the bean grinder housing, it is vibrated with a small amplitude, and powder cannot be completely shaken out of the powder outlet. The operation needs to be performed for many times before cleaning residual powder, which is inconvenient to use.

SUMMARY

The present invention aims to solve the problem existing in the prior art, and provides a powder discharge outlet and a bean grinder using the powder discharge outlet. By turning the knob to vibrate the powder discharge pipe up and down, powder can be effectively shaken out of the powder discharge pipe, showing convenience during use.

In order to achieve the above objective, the present invention proposes the following technical solutions:

the powder discharge outlet, comprising the powder discharge pipe, wherein the upper bracket is arranged at the upper part of the powder discharge pipe, the lower bracket is arranged at the lower part of the powder discharge pipe, the upper bracket is connected to the lower bracket with a connector, the annular upper tooth seat is arranged on the outer wall of the powder discharge pipe, a plurality of upper vibrating teeth are evenly arranged along the circumferential direction at the bottom of the upper tooth seat, the powder discharge nozzle is arranged at the bottom of the lower bracket, the knob is arranged at the top of the powder discharge nozzle and detachably connected to the powder discharge nozzle, the lower bracket is limited in the knob and the knob is rotatably connected to the lower bracket, the annular lower tooth seat is arranged at the upper part of the powder discharge nozzle, a plurality of lower vibrating teeth corresponding to the upper vibrating teeth are arranged at the top of the lower tooth seat, and the lower vibrating teeth are abutted against the upper vibrating teeth.

Preferably, the center holes fitted to the powder discharge pipe are arranged on both the upper bracket and the lower bracket, and the inner diameter of the center holes is greater than the outer diameter of the powder discharge pipe.

Preferably, the lower bracket comprises the ring fitted to the lower tooth seat, the outwardly extending stopper is arranged on the ring, the outer side of the stopper is a cambered surface fitted to the inner surface of the knob, the limit block fitted to the stopper is arranged on the inner wall of the knob, and the stopper is located on the lower side of the limit block.

Preferably, the powder discharge nozzle is threadedly connected to the knob.

Preferably, the springs are arranged between the upper tooth seat and the upper bracket, the top ends of the springs are abutted against the upper bracket, and the bottom ends are abutted against the upper tooth seat.

Preferably, the mounting holes fitted to the springs are arranged on the upper tooth seat, the number of springs is at least two, and a plurality of springs are evenly arranged along the circumferential direction of the upper tooth seat.

Preferably, both the upper vibrating tooth and the lower vibrating tooth comprise a vertical surface and an inclined surface.

Preferably, the groove is arranged between the two adjacent upper vibrating teeth.

Preferably, the anti-skid lines are arranged on the outer wall of the knob.

The bean grinder, wherein the powder discharge outlet of the bean grinder adopts the structure of powder discharge outlet described above.

Compared with the prior art, the present invention has the following beneficial effects:

1. The powder discharge pipe of the present invention can move up and down. The rotation of the knob can drive the lower vibrating teeth to rotate around the axis of the powder discharge pipe to allow the upper vibrating teeth to slide relative to the lower vibrating teeth. During the sliding of the upper vibrating teeth relative to the lower vibrating teeth, the upper vibrating teeth move along the tooth surface of the lower vibrating teeth, which enables the upper tooth seat to move up and then down under the action of gravity. The powder discharge pipe moves synchronously with the upper tooth seat. By rotating the knob, the powder discharge pipe can be driven to vibrate up and down, out of which powder can be effectively shaken, showing convenience during use.

2. The springs of the present invention exert downward thrust to the powder discharge pipe to move the upper tooth seat to the highest point and quickly drop it, so as to improve the vibration of the powder discharge pipe.

DESCRIPTION OF THE REFERENCE NUMERALS

Figure 1:
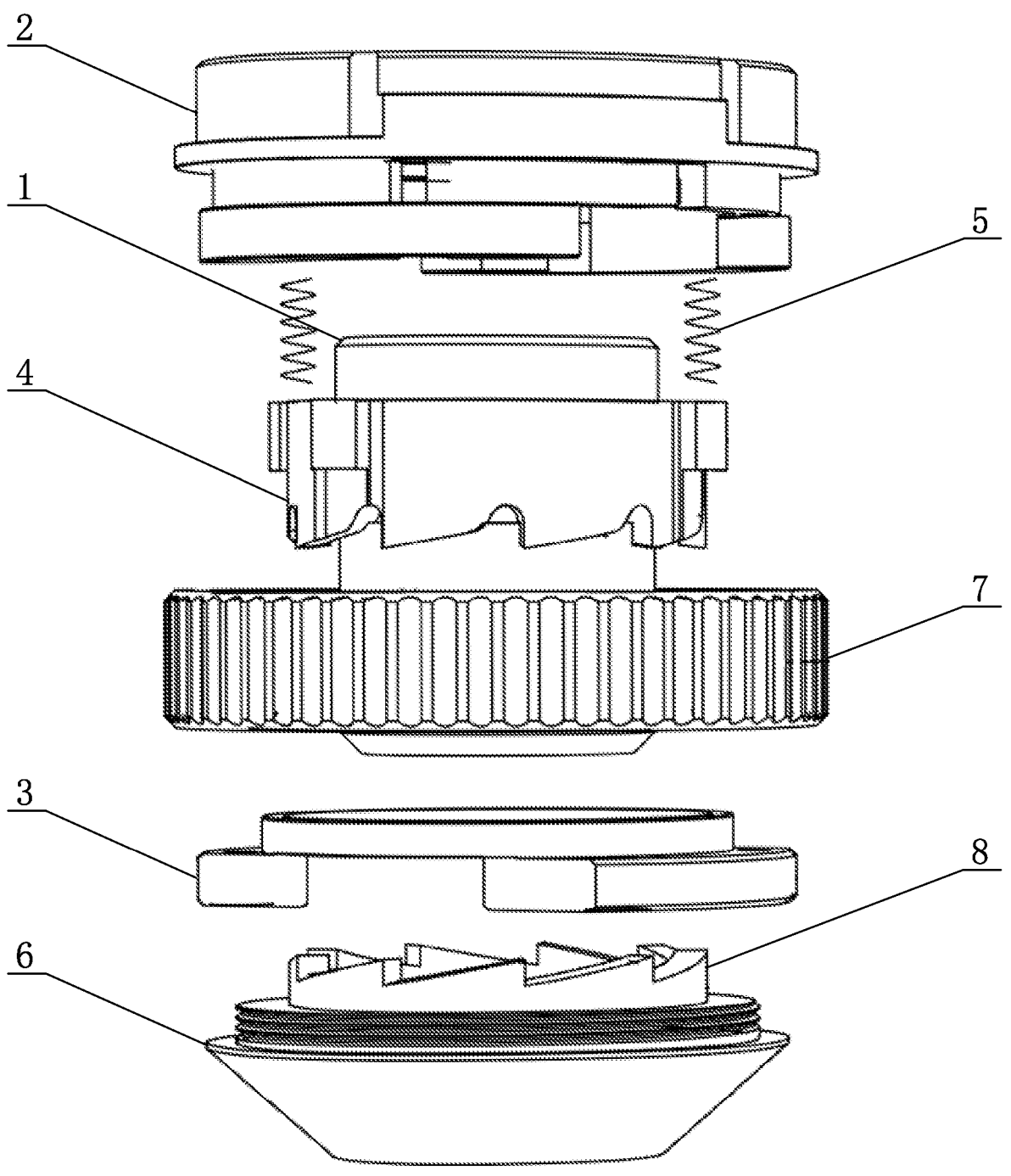
FIG. 1 is the structural schematic diagram of the powder discharge outlet in the present invention.
Figure 2:
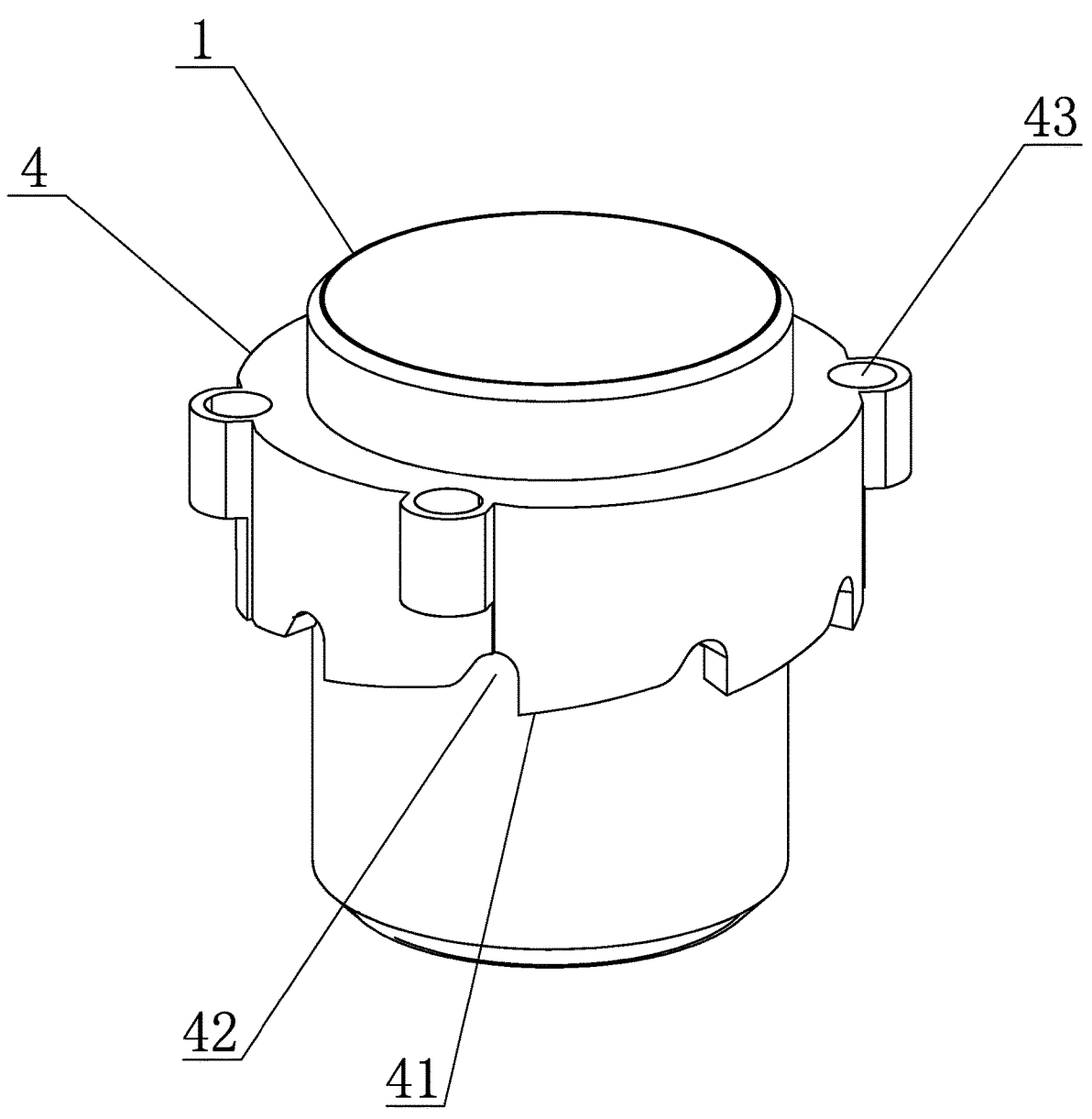
FIG. 2 is the structural schematic diagram of the powder discharge pipe.
Figure 3:
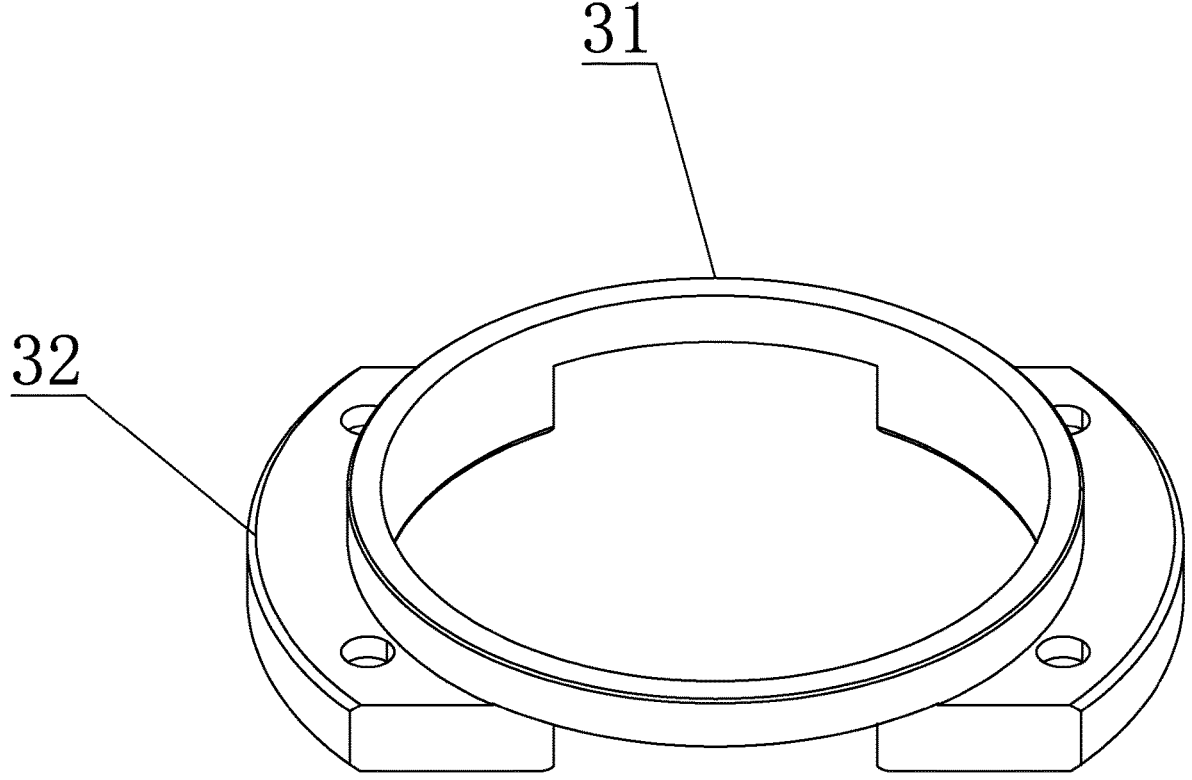
FIG. 3 is the structural schematic diagram of the lower bracket.

1. Powder discharge pipe; 2. Upper bracket; 3. Lower bracket; 31, Ring; 32, Stopper; 4. Upper tooth seat; 41. Upper vibrating tooth; 42. Mounting hole; 43. Groove; 5. Spring; 6. Powder discharge nozzle; 7, Knob; 8. Lower tooth seat; 81. Lower vibrating tooth.

DETAILED DESCRIPTION

The present invention will be further described with reference to specific embodiments. It is to be understood that these embodiments are merely illustrative of the present invention instead of limiting the present invention. Further, it is to be understood that those skilled in the art may make modifications or alterations to the present invention after reading the contents of the present invention, and that these equivalents shall fall within the scope defined by the present disclosure.

Embodiment 1: A powder discharge outlet, comprising the powder discharge pipe 1, wherein the upper bracket 2 is arranged at the upper part of the powder discharge pipe 1, the lower bracket 3 is arranged at the lower part of the powder discharge pipe 1, the upper bracket 2 is connected to the lower bracket 3 by a connector with screws, corresponding screw mounting holes are opened in both the upper bracket 2 and the lower bracket 3, connecting holes are opened in the upper bracket 2, and the upper bracket 2 is fixed by screws to the housing of the bean grinder, Preferably, the center holes fitted to the powder discharge pipe 1 are arranged on both the upper bracket 2 and the lower bracket 3, and the inner diameter of the center holes is greater than the outer diameter of the powder discharge pipe 1.

The annular upper tooth seat 4 is arranged on the outer wall of the powder discharge pipe 1, the upper tooth seat 4 can be integrated with the powder discharge pipe 1, the axis of the upper tooth seat 4 coincides with that of the powder discharge pipe 1, and a plurality of upper vibrating teeth 41 are arranged evenly along the circumferential direction at the bottom of the upper tooth seat 4.

The powder discharge nozzle 6 is arranged at the bottom of the lower bracket 3, the knob 7 is arranged at the top of the powder discharge nozzle 6, the knob 7 is detachably connected to the powder discharge nozzle 6, the knob 7 can be connected by snaps to the powder discharge nozzle 6. Preferably, the powder discharge nozzle 6 is threadedly connected to the knob 7 to facilitate the removal of the knob 7 from the powder discharge nozzle 6, external threads are machined on the powder discharge nozzle 6, and corresponding internal threads are machined on the inner wall of the knob 7.

The lower bracket 3 is limited in the knob 7 and the knob 7 is rotatably connected to the lower bracket 3. The lower bracket 3 is located inside the knob 7, and the axes of the knob 7, the lower bracket 3, the upper bracket 2, and the powder discharge pipe 1 coincide with each other. Preferably, in order to facilitate the assembly of the present invention, the lower bracket 3 comprises the ring 31 fitted to the lower tooth seat 8, the outwardly extending stopper 32 is arranged on the ring 31, the outer side of the stopper 32 is a cambered surface fitted to the inner surface of the knob 7, the limit block fitted to the stopper 32 is arranged on the inner wall of the knob 7, and the stopper 32 is located on the lower side of the limit block.

The annular lower tooth seat 8 is arranged at the top of the powder discharge nozzle 6, and the lower tooth seat 8 can be integrated with the powder discharge nozzle 6. The lower vibrating teeth 81 corresponding to the upper vibrating teeth 41 are arranged at the top of the lower tooth seat 8, and the lower vibrating teeth 81 are abutted against the upper vibrating teeth 41.

When the knob 7 is rotated, the lower tooth seat 8 rotates synchronously with it, which can drive the lower vibrating teeth 81 to rotate around the axis of the powder discharge pipe 1, and allow the upper vibrating teeth 41 to slide relative to the lower vibrating teeth 81. During the sliding of the upper vibrating teeth 41 relative to the lower vibrating teeth 81, the upper vibrating teeth 41 move along the tooth surface of the lower vibrating teeth 81, the upper tooth seat 4 moves up and down under the action of the springs 5 and the powder discharge pipe 1 moves synchronously with the upper tooth seat 4, Which enables the upper tooth seat 4 to move up and then down under the action of gravity. By rotating the knob 7, the powder discharge pipe 1 can be driven to vibrate up and down, out of which powder can be effectively shaken, showing convenience during use.

Preferably, in order to improve the vibration of the powder discharge pipe, the springs 5 are arranged between the upper tooth seat 4 and the upper bracket 2, the top ends of the springs 5 are abutted against the upper bracket 2, the bottom ends are abutted against the upper tooth seat 4. The springs 5 exert downward thrust to the upper tooth seat 4, and one spring 5 can be used to directly apply on the powder discharge pipe 1; further, the number of springs 5 is at least two, a plurality of springs 5 are evenly arranged along the circumferential direction of the upper tooth seat 4, and the mounting holes 42 fitted to the springs 5 are opened in the upper tooth seat 4. The mounting holes 42 are blind holes arranged at the top of the upper tooth seat 4, which can balance the force evenly.

Figure 4:
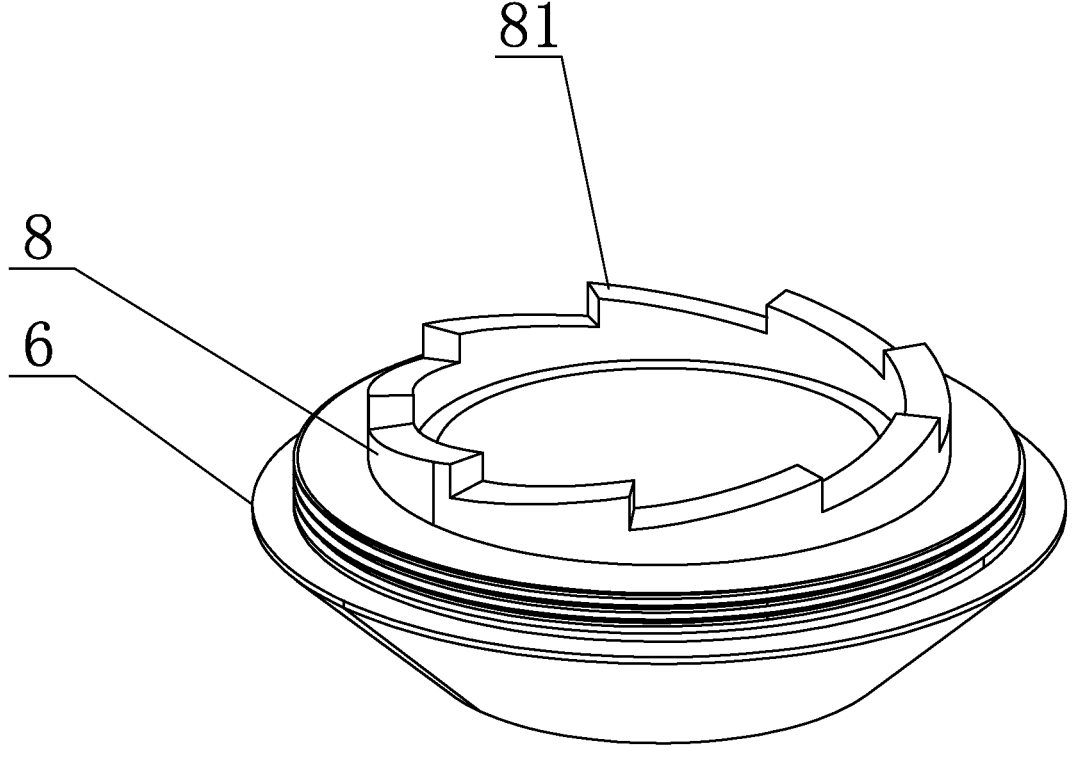
FIG. 4 is the structural schematic diagram of the powder discharge nozzle.
Figure 5:
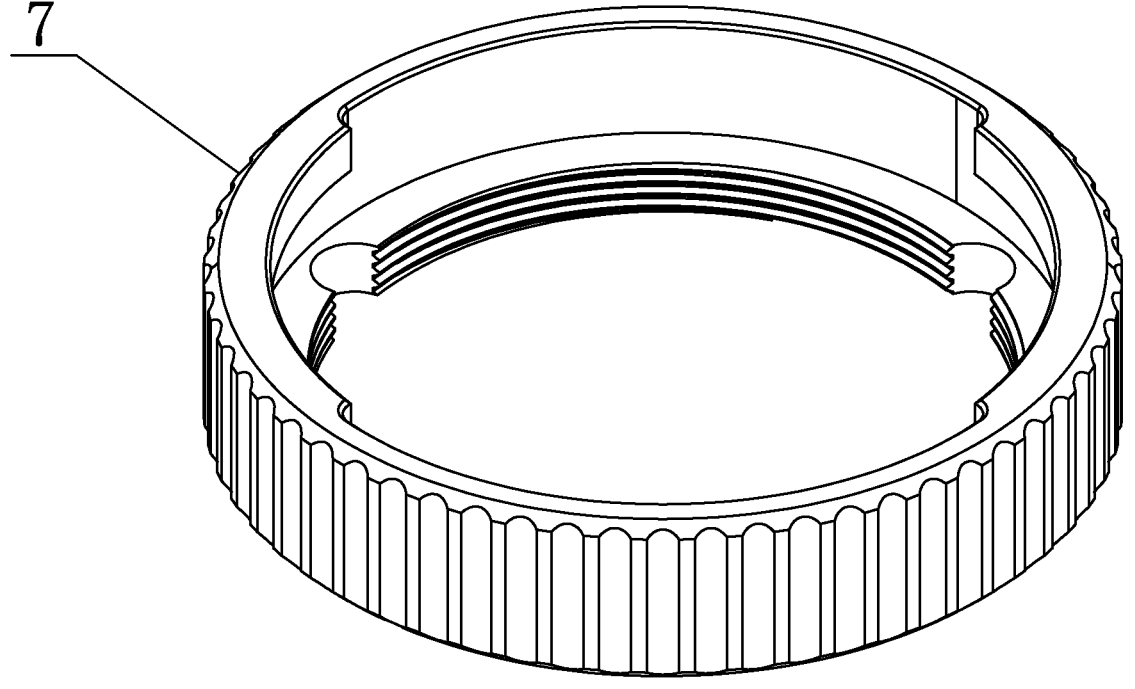
FIG. 5 is the structural schematic diagram of the knob.
Figure 6:
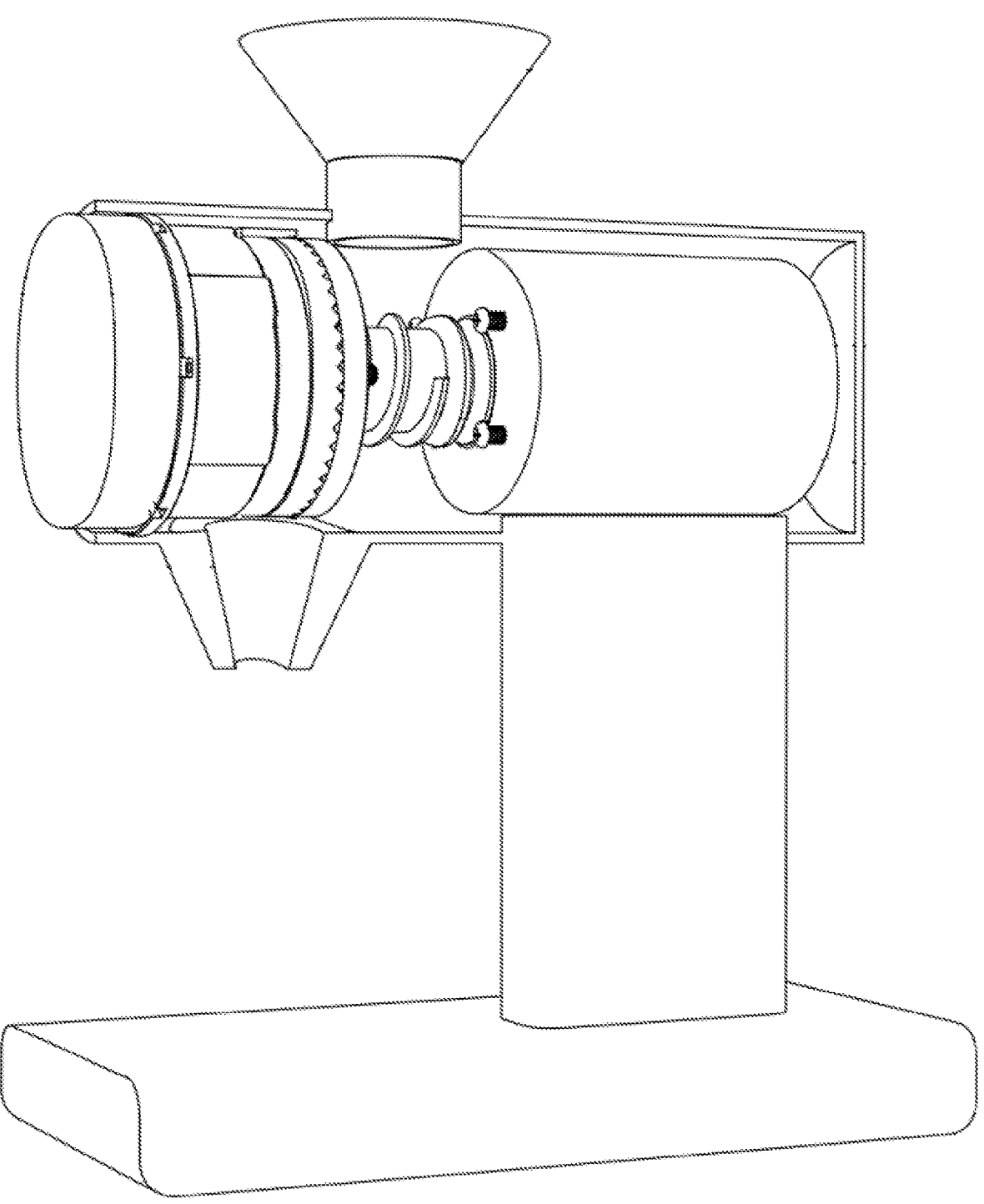
FIG. 6 is the structural schematic diagram of the powder discharge outlet of traditional bean grinders.

Preferably, in order to improve the vibration of the powder discharge pipe, both the upper vibrating tooth 41 and the lower vibrating tooth 81 comprise a vertical surface and an inclined surface. As shown in FIG. 4, the vertical surface of the lower vibrating tooth 81 is at one end of the highest point of the inclined surface. During the relative sliding of the upper vibrating teeth 41 along the inclined surface of the lower vibrating teeth 81, the upper tooth seat 4 gradually moves upward, overcomes the elastic force of the springs 5, and the springs 5 are compressed. When the upper vibrating teeth 41 slide to the highest point of the inclined surface of the lower vibration teeth 81, the upper tooth seat 4 quickly falls under the action of the springs 5 to improve the vibration effect.

Preferably, the groove 43 is arranged between the two adjacent upper vibrating teeth 41 to avoid damage to the upper vibrating teeth and the lower vibrating teeth due to collision between them.

Preferably, the anti-skid lines are arranged on the outer wall of the knob 7 to facilitate rotation of the knob.

Figure 7:
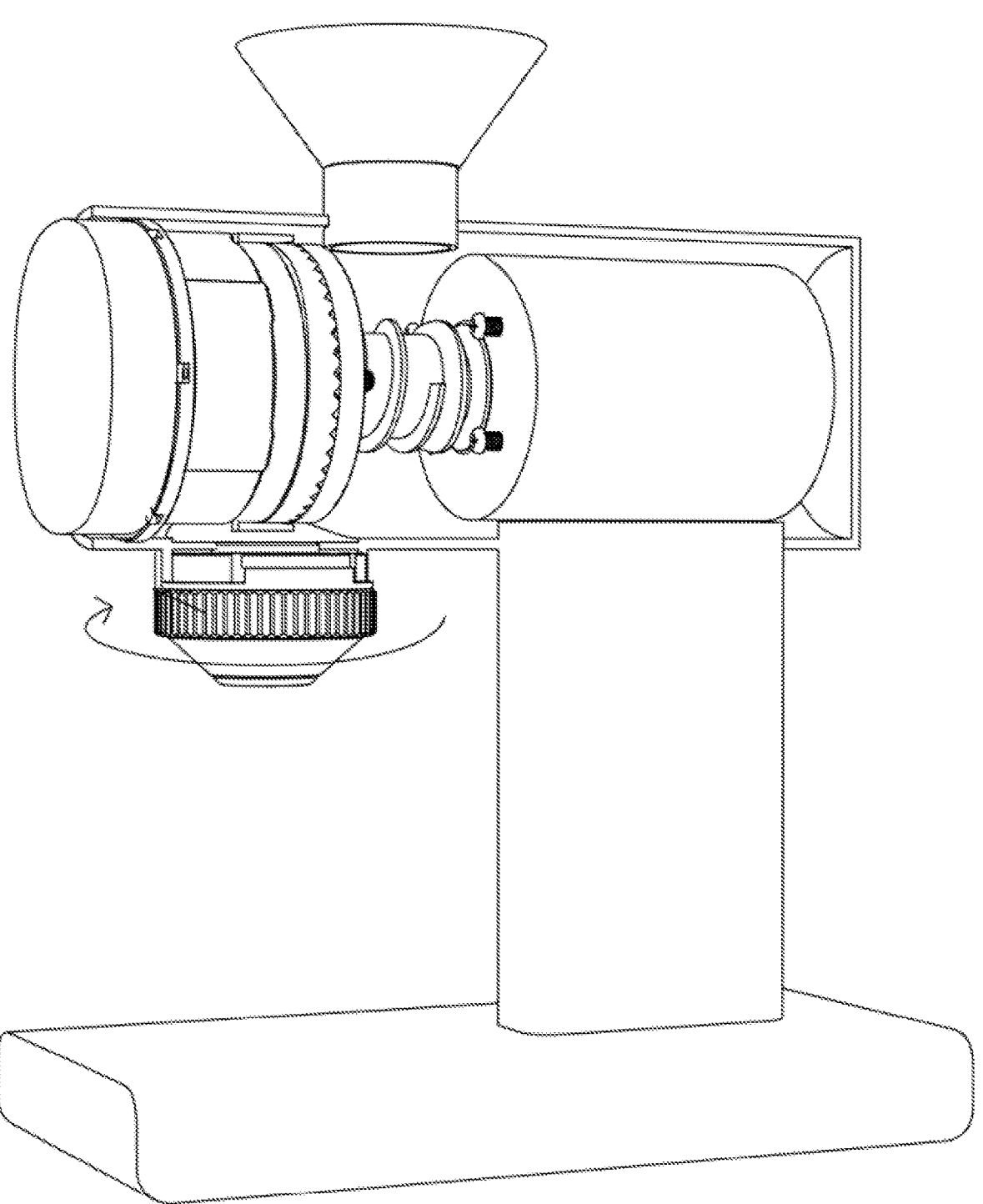
FIG. 7 is the structural schematic diagram of the powder discharge outlet of bean grinders in the present invention.

Embodiment 2: As shown in FIG. 7, the present invention is a bean grinder. The powder discharge outlet of the bean grinder adopts the structure of powder discharge outlet described in Embodiment 1. A powder discharge hole fitted to the powder discharge pipe 1 is opened on the bean grinder housing. The powder discharge hole is located on the lower side of the cutter head. The upper bracket 2 can be inset on the bean grinder housing or fixed to the bean grinder housing by screws.

What is claimed is:

1. A powder discharge outlet, comprising: a powder discharge pipe, wherein an upper bracket is arranged at an upper part of the powder discharge pipe, a lower bracket is arranged at a lower part of the powder discharge pipe, the upper bracket is connected to the lower bracket with a connector, an annular upper tooth seat is arranged on an outer wall of the powder discharge pipe, a plurality of upper vibrating teeth are evenly arranged along a circumferential direction at a bottom of the upper tooth seat, a powder discharge nozzle is arranged at a bottom of the lower bracket, a knob is arranged at a top of the powder discharge nozzle, the knob is detachably connected to the powder discharge nozzle, the lower bracket is limited in the knob, and the knob is rotatably connected to the lower bracket, an annular lower tooth seat is arranged at an upper part of the powder discharge nozzle, a plurality of lower vibrating teeth corresponding to the upper vibrating teeth are arranged at a top of the lower tooth seat, and the lower vibrating teeth are abutted against the upper vibrating teeth.

2. The powder discharge outlet according to claim 1, wherein center holes fitted to the powder discharge pipe are arranged on both the upper bracket and the lower bracket, and an inner diameter of the center holes is greater than an outer diameter of the powder discharge pipe.

3. The powder discharge outlet according to claim 1, wherein the lower bracket comprises a ring fitted to the lower tooth seat, an outwardly extending stopper is arranged on the ring, an outer side of the stopper is a cambered surface fitted to an inner surface of the knob, a limit block fitted to the stopper is arranged on an inner wall of the knob, and the stopper is located on a lower side of the limit block.

4. The powder discharge outlet according to claim 1, wherein the powder discharge nozzle is threadedly connected to the knob.

5. The powder discharge outlet according to claim 1, wherein springs are arranged between the upper tooth seat and the upper bracket, top ends of the springs are abutted against the upper bracket, and bottom ends are abutted against the upper tooth seat.

6. The powder discharge outlet according to claim 5, wherein mounting holes fitted to the springs are arranged on the upper tooth seat, there are at least two springs, and the at least two springs are evenly arranged along a circumferential direction of the upper tooth seat.

7. The powder discharge outlet according to claim 1, wherein both the upper vibrating tooth and the lower vibrating tooth comprise a vertical surface and an inclined surface.

8. The powder discharge outlet according to claim 1, wherein a groove is arranged between two adjacent upper vibrating teeth.

9. The powder discharge outlet according to claim 1, wherein anti-skid lines are arranged on an outer wall of the knob.

10. A bean grinder, wherein a powder discharge outlet of the bean grinder is the powder discharge outlet according to claim 1.

11. A bean grinder, wherein a powder discharge outlet of the bean grinder is the powder discharge outlet according to claim 2.

12. A bean grinder, wherein a powder discharge outlet of the bean grinder is the powder discharge outlet according to claim 3.

13. A bean grinder, wherein a powder discharge outlet of the bean grinder is the powder discharge outlet according to claim 4.

14. A bean grinder, wherein a powder discharge outlet of the bean grinder is the powder discharge outlet according to claim 5.

15. A bean grinder, wherein a powder discharge outlet of the bean grinder is the powder discharge outlet according to claim 6.

16. A bean grinder, wherein a powder discharge outlet of the bean grinder is the powder discharge outlet according to claim 7.

17. A bean grinder, wherein a powder discharge outlet of the bean grinder is the powder discharge outlet according to claim 8.

18. A bean grinder, wherein a powder discharge outlet of the bean grinder is the powder discharge outlet according to claim 9.

* * * * *